United States Patent [19]

Kay

[11] 4,210,310

[45] Jul. 1, 1980

[54] FLUID CONTROL VALVES

[76] Inventor: Francis X. Kay, The School House, Addington, Buckinghamshire, England

[21] Appl. No.: 910,941

[22] Filed: May 30, 1978

[30] Foreign Application Priority Data

Nov. 28, 1977 [GB] United Kingdom ............ 49465/77

[51] Int. Cl.² ........................................ F16K 31/126
[52] U.S. Cl. ............................ 251/61.1; 137/596.18; 137/863; 92/49; 92/97
[58] Field of Search ..................... 137/596.14, 596.15, 137/596.16, 596.18, 863, 885; 251/61.1; 92/48, 49, 97, 98 R

[56] References Cited

U.S. PATENT DOCUMENTS

| 2,376,918 | 5/1945 | Hughes | 251/61.1 |
| 2,966,927 | 1/1961 | Peters | 137/596.18 |
| 3,116,918 | 1/1964 | Francis | 92/49 |
| 3,182,684 | 5/1965 | Hutchison | 92/48 |
| 3,187,640 | 6/1965 | Young et al. | 92/48 |
| 3,575,190 | 4/1971 | Paster et al. | 137/596.18 |
| 3,653,408 | 4/1972 | Coiner | 251/61.1 |
| 3,934,611 | 1/1976 | Gachot et al. | 251/61.1 |
| 3,973,533 | 8/1976 | Arano | 92/48 |

FOREIGN PATENT DOCUMENTS 974246 2/1951 France ............................ 251/61.1

Primary Examiner—Martin P. Schwadron
Assistant Examiner—G. L. Walton
Attorney, Agent, or Firm—Kurt Kelman

[57] ABSTRACT

A sphincter valve for the control of fluid flow is characterized by a pair of diaphragms spaced apart from one another and having different effective areas. The smaller-area diaphragm is adapted for deflection into sealing engagement with a seating to control fluid flow thereacross, whereas the larger-area diaphragm is arranged to be exposed to operating (pilot or signal) fluid to be deflected thereby towards the smaller-area diaphragm. A thrust transmission element disposed between the diaphragms serves to deflect the smaller-area diaphragm in response to deflection of the larger-area diaphragm.

8 Claims, 8 Drawing Figures

FLUID CONTROL VALVES

FIELD OF THE INVENTION

The invention concerns fluid control valves and is especially concerned with valves intended to control relatively large flows of fluid.

BACKGROUND TO THE INVENTION AND THE PRIOR ART

In the design of valves for controlling large flows of fluid, one of the important problems is the avoidance of excessive bulk and weight, particularly in regard to the elements that are shifted to accomplish control functions. In the case of valves that use a piston or spool as a mobile member shiftable to effect the required control function, the valve construction is relatively simple but the fluid flow capacity of the valve is small in relation to the overall size of the valve. When large fluid flows have to be accommodated, the valve size becomes excessive and in particular the piston or spool has to be of such a size and mass that its operational speed is limited.

For these reasons it is often preferred to use a poppet valve for controlling large fluid flows, because this type of valve has an intrinsically large flow capacity for a given overall size. However, poppet valves of conventional type involve a complex construction if they are required to control more than one fluid stream. Thus it is a characteristic of the type that one poppet element is required for the control of each pair of ports so that to achieve the equivalent control functions of a 5-port relay valve such as used, for instance, to control a double-acting power cylinder, a valve having four poppet elements would be required.

The complexity of a multi-port poppet valve derives from the number of poppet elements involved and the means provided for operating these in the required combinations.

The desirable flow capacity of the poppet valve design can also be achieved by the so-called sphincter valve design in which the movement of a flexible diaphragm is used to control the flow of fluid between a pair of ports. In one valve construction of this type, one port is located centrally opposite to the diaphragm so that movement of the diaphragm towards that port can be arranged to seal the port from an adjacent port. This movement of the diaphragm may be brought about by fluid pressure applied to the opposite side of the diaphragm or by mechanical means. This simple construction has however the disadvantage that because the diaphragm engages the edges of the port it is subject to wear and possible damage by such engagement.

For this reason, the more usual sphincter valve construction involves a partition between a pair of fluid flow ports, the partition presenting a ridge formation to a diaphragm that can be deflected into engagement with that formation to make a seal having line contact of a controllable width, whereby the stresses to which the diaphragm material is subjected are predictable, permitting the diaphragm to be designed appropriately to withstand those stresses for an acceptable working life.

Another problem that arises in the design of sphincter valves is that of providing the required force to deflect the diaphragm into its port-closing position, especially when the valve has to control fluid flows at relatively high pressure. Mechanical means for accomplishing the required diaphragm deflection can generate the required forces but when the diaphragm deflection is to be caused by a pilot or signal pressure fluid it is usually necessary to provide that pressure fluid with some mechanical advantage in its action upon the diaphragm. Thus, for instance, it is common to employ a large diameter piston that is acted upon by the pilot or signal pressure fluid and that serves to apply thrust to a mechanical part suitably shaped to fit the diaphragm when engaged with the seat against which the latter is to be sealed in the port-closing position.

In such a construction, some resilience in the sealing system is necessary, either in the thrust-transmitting component or in the diaphragm in order to ensure adequate sealing of the diaphragm over the whole area of contact with its seat. Even so, the relevant mating parts must be made to close dimensional tolerances if satisfactory sealing is to be ensured without the need for excessive forces. It is common to make the diaphragm of such a valve from a thick, soft elastomeric material so that its sealing area can accommodate discrepancies in the shape of the mechanical thrust-transmitting component and the seating. However, the necessary softness and thickness of the diaphragm material makes the diaphragm prone to permanent deformation and fatigue failures.

THE INVENTION

A sphincter valve in accordance with the present invention is characterised by a pair of diaphragms spaced apart from one another and having different effective areas, the smaller-area diaphragm being adapted for deflection into sealing engagement with a seating to control the flow of fluid across such seating whereas the larger-area diaphragm is adapted to be exposed to operating fluid and to deflect in response thereto to apply valve-closing thrust to the smaller-area diaphragm via a transmission element positioned between the diaphragms and having a configuration and position conforming to the configuration and position of the said seating.

By reason of the different effective areas of the two spaced-apart diaphragms, and the use of a transmission element for transmitting thrusts between the two diaphragms and thus effectively isolating each from the fluid pressure to which the other is exposed, a suitably large valve-closing force may be applied to the smaller-area (control) diaphragm by an operating fluid acting on the larger-area (operating) diaphragm and having a pressure lower than the pressure of the fluid to be controlled by the valve. Thus the operating diaphragm performs the same function as the larger-diameter piston that is sometimes utilised to displace the diaphragm of a sphincter valve of the conventional construction above discussed, but for a given effective area is much more compact and easily housed than such a piston and much simpler and more economic to manufacture.

Both diaphragms may be relatively thin, so avoiding the problems of permanent deformation and fatigue failure that hitherto have limited the usefulness of the sphincter valve construction for controlling high pressure fluids.

Conveniently the diaphragms are disposed on opposite sides of a ported spacer, the thrust transmission element being disposed within the port of said spacer. The area of the port in such spacer may thus determine the effective area of the control diaphragm as regards transmission of thrust from the pressure fluid being controlled to the operating diaphragm that is exposed to pilot or signal pressure operating fluid.

The said seating may be annular and surround a controlled fluid flow port, but is preferably linear and in the form of a ridge defined by the edge of a partition between a pair of controlled fluid flow ports. This ridge is desirably shaped to suit the configuration of the control diaphragm when it is deflected into contact therewith under the influence of operating fluid pressure applied to the operating diaphragm, and the resultant thrust transmitted by the thrust transmission element, taking account of any distortion to which the control diaphragm may be liable as a result of fluid flow across the ridge.

Thus the ridge may be both longitudinally and transversely concave, perhaps presenting a spherically curved surface to the diaphragm, or it may be longitudinally concave but transversely either flat or convex.

The transmission element may be elastomeric and may be of circular cross section or of any other cross section adapted to transmit the required thrust load between the diaphragms in a manner to generate the required valve-closing pressure on the seating with the avoidance of unwanted local overstressing of the diaphragms.

Because the double diaphragm assembly is inherently compact and readily accommodated in a valve housing of size determined primarily by the port and flow passage cross sections required for the controlled fluid, several valve units constructed in accordance with the invention may be disposed in a compact assembly, possibly with corresponding components of the units formed integrally as a single component of the assembly, with internal and/or external interconnections, possibly provided by a mount for units of the assembly to provide the functions of a multi-port valve, such as a relay valve, within a conveniently small and compact envelope.

The Drawings.

In the accompanying drawings forming a part hereof:

DESCRIPTION OF PREFERRED EMBODIMENTS

Figure 1:
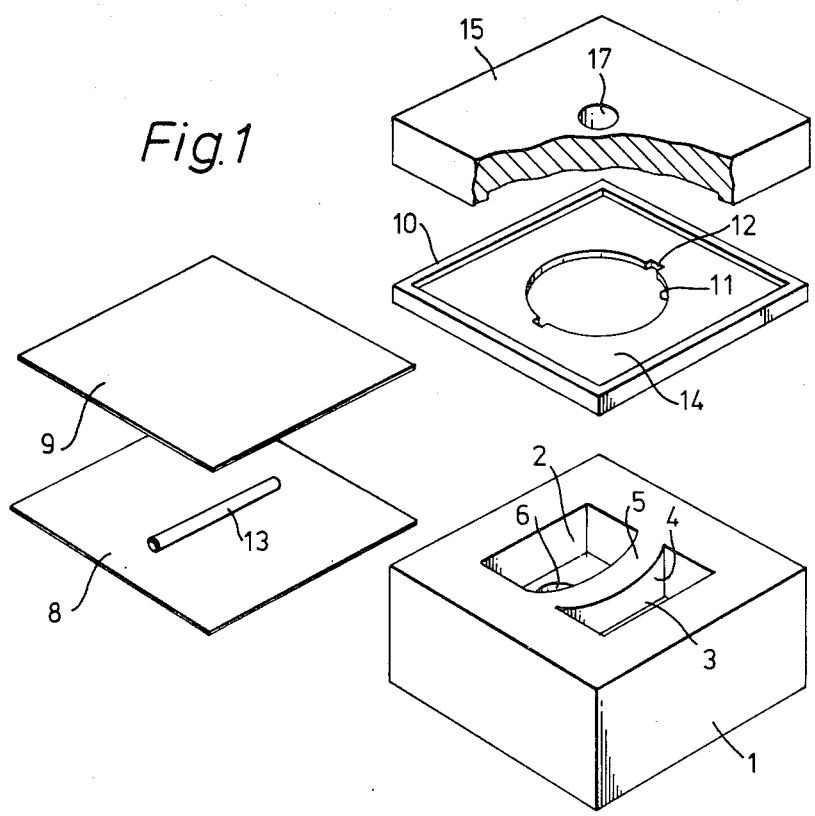
FIG. 1 is a semi-diagrammatic exploded perspective view of a sphincter valve unit embodying the invention.
Figure 2:
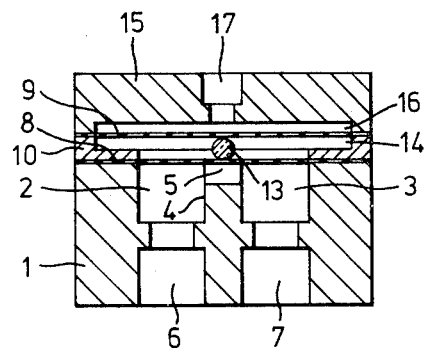
FIG. 2 is a sectional view of the valve unit of FIG. 1 on a plane containing the axes of the valve ports.
Figure 3:
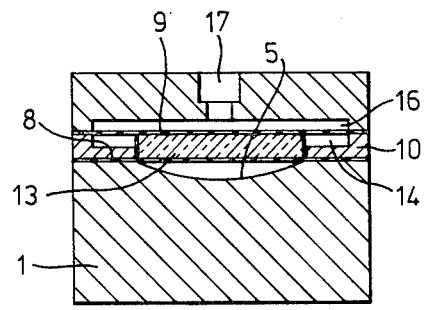
FIG. 3 is a sectional view on a plane at right angles to that of FIG. 2.
Figure 7:
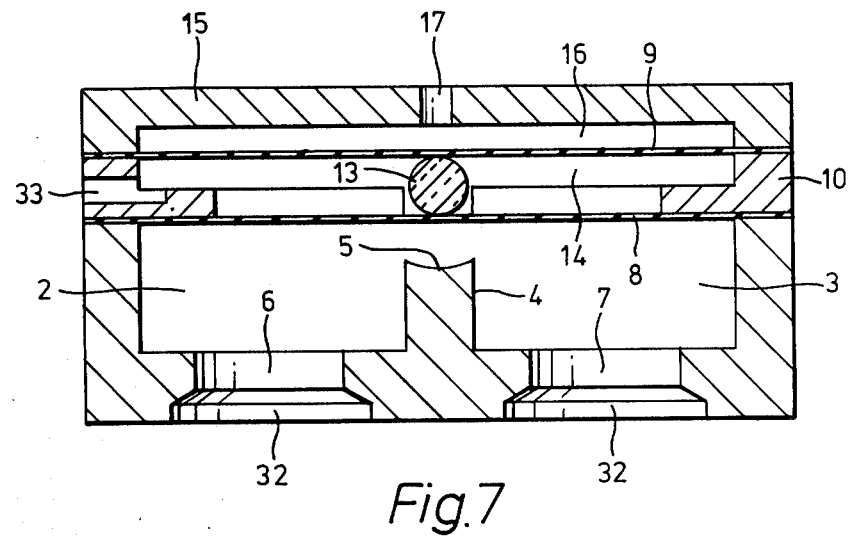
FIGS. 7 and 8 are sectional views of valve units intended for attachment to an interconnecting mount.
Figure 8:
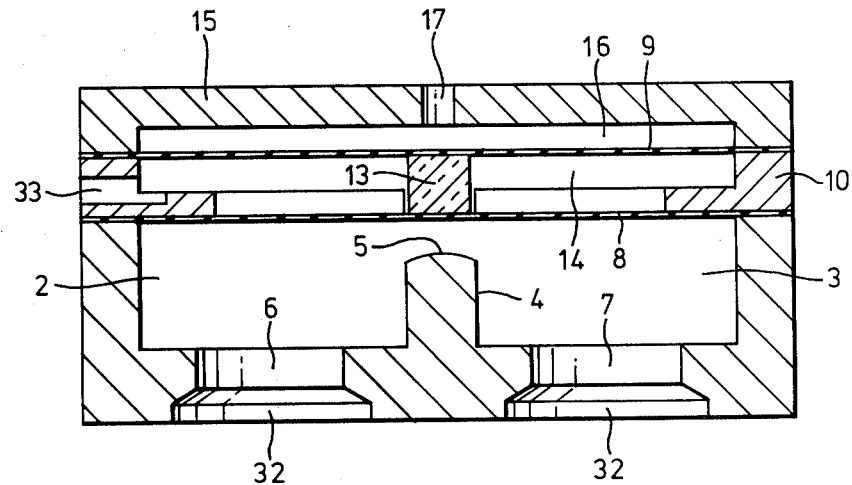

The basic valve unit illustrated in FIGS. 1 to 3 comprises a body 1 shown in the form of a rectangular block having a rectangular recess formed in one face thereof and divided into chambers 2 and 3 by a transverse partition 4 the exposed surface of which defines a seating 5 that is longitudinally concave. In transverse section this seating 5 may be flat, or it may be concave as shown in FIG. 7 or convex as shown in FIG. 8, as may be appropriate.

Controlled fluid ports 6 and 7 open into the respective chambers 2 and 3 on opposite sides of the partition 4.

The valve further comprises a control diaphragm 8 and an operating diaphragm 9 disposed on opposite sides of a spacer element 10 having a circular central port 11.

Diametrically opposite cut-outs 12 in the port 11 serve to locate the ends of a thrust transmission element 13 that in this case is both flexible and resilient, being in the form of a circular-section rubber cord of thickness corresponding to the distance between the diaphragms as determined by the distance between opposite faces of the element 10. The upper surface of the element 10 is recessed as shown at 14 so that when the operating diaphragm 9 is located between the spacer element 10 and a cover 15 having a recess 16 matching the recess 14, the diaphragm 9 has an effective area equivalent to the superficial area of the recess 14.

The cover 15 has a pilot or signal operating fluid port 17 (FIGS. 2 and 3) communicating with the recess 16 spanned by the diaphragm 9 so that pilot or signal pressure applied to the port 17 may deflect the diaphragm 9 downwardly as seen in the drawings.

The spacer element 10 has a port (not shown) extending suitably into its recess 14 to vent the space between the diaphragms 8 and 9 whereby the fluid pressure effective on one diaphragm is isolated from the other, save as transmitted by the transmission element 13.

When the operating diaphragm 9 is deflected by the application of pilot or signal pressure to the port 17, the thrust generated by such deflection is transmitted via the transmission element 13 to the control diaphragm 8 that in turn is deflected so as to engage the seating 5 on the partition 4 and thus isolate the two chambers 2 and 3 in the body 1, and hence the controlled fluid ports 6 and 7 from one another.

Figure 4:
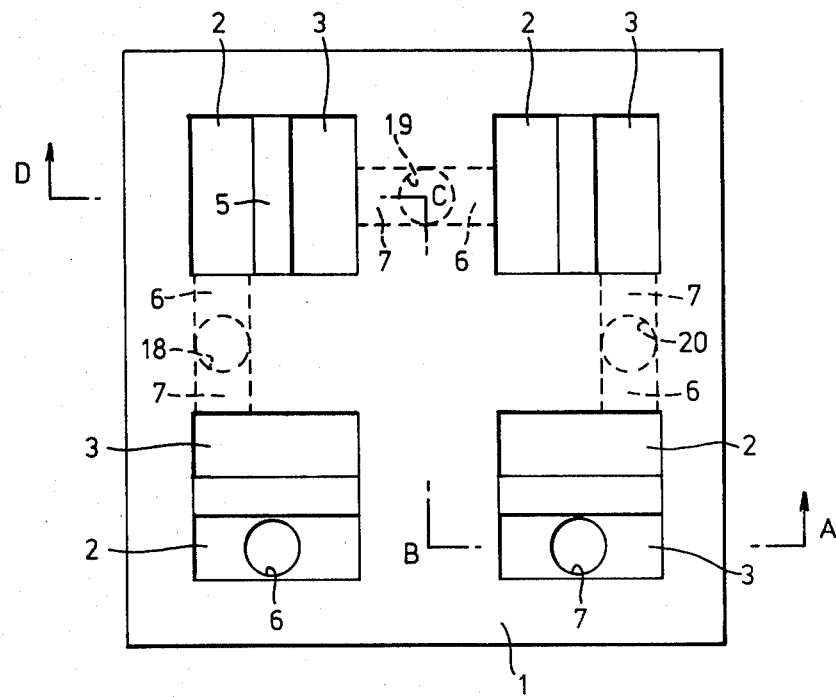
FIG. 4 is a diagrammatic plan section of a four-unit multi port valve assembly.
Figure 5:
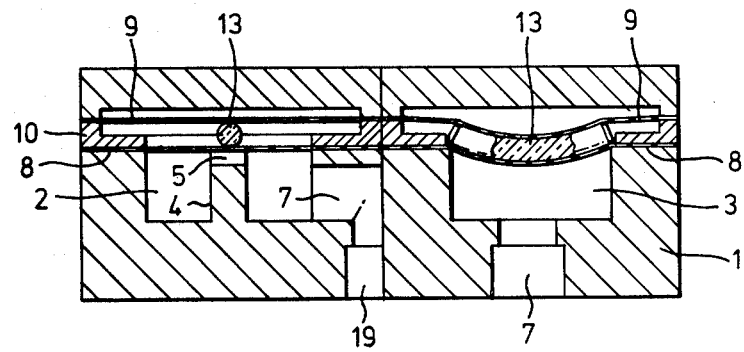
FIG. 5 is a sectional elevation on the line A-B-C-D of FIG. 4.

FIGS. 4 and 5 illustrate a valve assembly comprising four basic valve units of a construction similar to that illustrated in FIGS. 1 to 3, arranged as two pairs side by side. Although the drawings illustrate the assembly as though the components of the respective valve units were separate, the corresponding components of the units may in fact be formed integrally: that is to say the four valve unit bodies 1 may be formed as a single component and similarly the four control diaphragms 8 may be formed as a single diaphragm as may also the four operating diaphragms 9. The four spacer elements 10 may be formed as a single component as may also the four covers 15.

In FIGS. 4 and 5, components corresponding with those described and illustrated in FIGS. 1 to 3 have been shown with the same reference numbers as in those Figures.

It will be noted that the four valve units in the assembly have one or the other or both of their respective controlled fluid ports 6, 7 disposed in side walls of the body 1 so as to provide for inter-connection of appropriate ports of adjacent units. When the valve units have separate individual bodies 1 the ports in the side walls thereof may be interconnected in any suitable way; however conveniently the ports would be connected by being held in register with a suitable seal, such as an O-ring, trapped between the two unit bodies 1 and housed in suitable recesses in the two bodies. When, however, as is preferred, the valve unit bodies 1 are integrally formed as a single component of the assembly, the required interconnection of controlled fluid ports may be achieved as shown, by forming the interconnected ports as appropriate passages in the material of the body.

Interconnected ports will in most applications of such a valve assembly, as shown in FIGS. 4 and 5 require to be accessible to external connections: this may be achieved by the provision of suitable access passages in the bodies 1 of appropriate units when the assembly comprises separable units, whereas, when the assembly comprises a single integral component constituting the bodies 1, this may be provided with external ports, such as the ports 18, 19, 20 shown in FIGS. 4 and 5.

With the valve units arranged and interconnected as shown in FIGS. 4 and 5, selective operation of the valve units can set up port interconnections and controlled fluid flow paths equivalent to those available in a conventional 5-port piston or spool valve. For the purpose of illustration, the right hand unit shown in FIG. 5 is shown with its diaphragms deflected so that the diaphragm 8 engages the seating 5 to isolate the port 7 from the port 6 of that unit.

Figure 6:
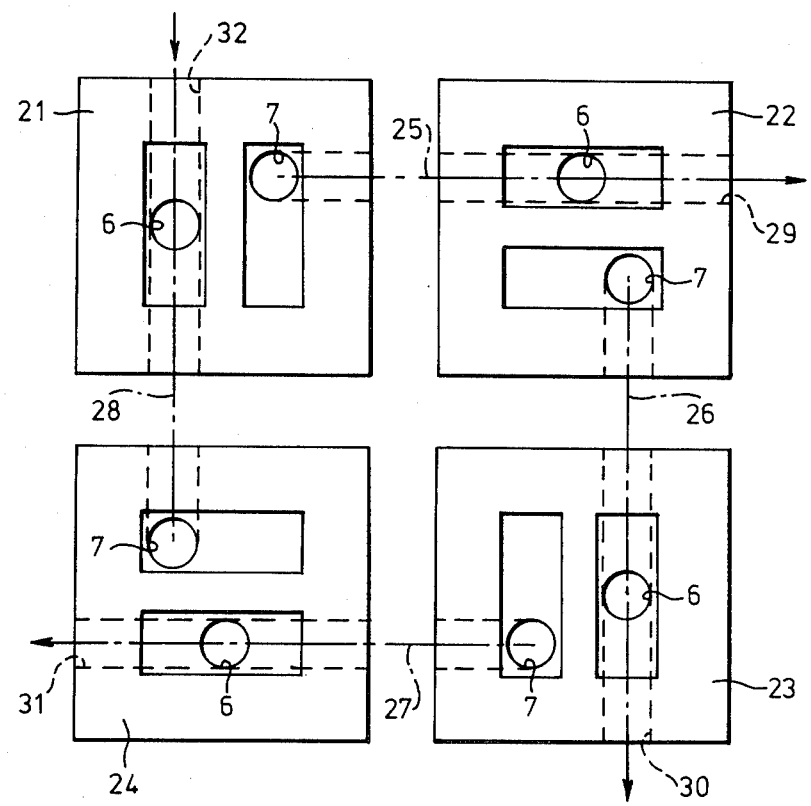
FIG. 6 is a diagrammatic illustration in plane section of four 2-port valve units externally interconnected to achieve the functions of the multi-port valve assembly.

FIG. 6 diagrammatically illustrates the manner in which the functions of the valve assembly of FIGS. 4 and 5 may be achieved by the use of four separate 2-port valve units 21-24 of a construction similar to that shown in FIGS. 1 to 3 with their respective ports 6, 7 externally interconnected as shown by broken lines indicating connecting conduits or passages 25-28 in a mount (not shown) providing access to these passages at ports 29-32.

To facilitate the making of external interconnections as indicated in FIG. 6, the valve units may be of the modified form illustrated in FIGS. 7 and 8, which show valve bodies 1 formed with ports 6, 7 that extend to recesses 32 intended to house O-ring or like seals (not shown) for sealing co-operation with recesses and ports in a mount formed with the required interconnecting passages having external connection access and to which the valve units may be affixed.

Valve units of the form illustrated in FIGS. 7 and 8 are thus suited for interchangeable fixing to a variety of mounts or manifold blocks to provide for the control of fluid flow between ports communicating with passages therein. They are also suited to fixing directly to suitable ports mounted on, e.g. large cylinders, rams or actuators, to control the flow of operating pressure fluid thereto.

The valve units shown in FIGS. 7 and 8 differ from one another in the configuration of the respective seating 5 and transmission element 13. In FIG. 7, the seating 5 is transversely concave and the element 13 is circular in section, whereas in FIG. 8 the seating 5 is transversely convex and the element 13 is square in section. These Figures also show vents 33 in the spacer element 10 for venting the interdiaphragm space.

Depending upon the fluid to be controlled, pressures and other operating parameters, the valves of the invention may be constructed from any suitable materials. For instance the valve bodies and covers may be formed from metal or from suitable plastics by a variety of fabrication techniques and the diaphragms may be formed of any suitable flexible and/or elastomeric material appropriate to their working environments.

I claim:

1. In a sphincter valve which comprises a body defining at least two chambers, a seating spanning a fluid flow path joining said chambers, a control diaphragm deflectable into sealing engagement with said seating to control fluid flow in said path, an operating diaphragm spaced from, and of larger effective area than, said control diaphragm, the operating diaphragm being deflectable by operating fluid towards said control diaphragm, and a non-rigid thrust transmission element disposed between said diaphragms, the thrust transmission element having a face in contact with the control diaphragm: the improvement of the contact face of the thrust transmission element having a configuration conforming solely to the configuration of said seating and being deflectable by the operating diaphragm to deflect the control diaphragm into said sealing engagement.

2. In the sphincter valve of claim 1, a ported spacer disposed between said diaphragms, the spacer defining a port having an area substantially smaller than that of the control diaphragm deflectable between the spacer and the seating, and the thrust transmission element being disposed within the port of the spacer.

3. In the sphincter valve of claim 1 or 2, a partition between said chambers, the partition having an upper edge, and said seating is linear and comprises a ridge defined by the upper edge of the partition.

4. In the sphincter valve of claim 3, the ridge having a surface configuration conforming to that of the control diaphragm when deflected into contact with the ridge by the operating fluid pressure applied to the operating diaphragm.

5. In the sphincter valve of claim 4, the ridge being longitudinally and transversely concave.

6. In the sphincter valve of claim 4, the ridge being longitudinally concave and transversely convex.

7. In the sphincter valve of claim 1 or 6, the thrust transmission element being elastomeric.

8. In the sphincter valve of claim 7, the thrust transmission element being of circular cross section.

* * * * *